(12) United States Patent
Ruffa

(10) Patent No.: US 8,300,303 B1
(45) Date of Patent: Oct. 30, 2012

(54) ACOUSTICALLY FOCUSED OPTICAL LENS

(75) Inventor: Anthony A. Ruffa, Hope Valley, RI (US)

(73) Assignee: The United States of America as represented by the Secretaryof the Navy, Washington, DC (US)

( * ) Notice: Subject to any disclaimer, the term of this patent is extended or adjusted under 35 U.S.C. 154(b) by 387 days.

(21) Appl. No.: 12/683,687

(22) Filed: Jan. 7, 2010

(51) Int. Cl.
*G02F 1/33* (2006.01)
(52) U.S. Cl. .................................. 359/310; 181/176
(58) Field of Classification Search ............... 359/285, 359/296, 305–312; 181/176
See application file for complete search history.

(56) References Cited

U.S. PATENT DOCUMENTS

| | | | |
|---|---|---|---|
| 5,665,605 | A | 9/1997 | Coakley et al. |
| 5,831,166 | A | 11/1998 | Kozuka et al. |
| 5,912,182 | A | 6/1999 | Coakley et al. |
| 6,055,859 | A | 5/2000 | Kozuka et al. |
| 6,216,538 | B1 | 4/2001 | Yasuda et al. |
| 6,467,350 | B1 | 10/2002 | Kaduchak et al. |
| 6,644,118 | B2 | 11/2003 | Kaduchak et al. |
| 2008/0195003 | A1* | 8/2008 | Sliwa et al. ..................... 601/3 |

OTHER PUBLICATIONS

Keith A. Higginson, Michael A. Costolo, and Edward A. Rietman, Tunable Optic Derived from Nonlinear Acoustic Effects, paper, Oct. 24, 2003, pp. 1-9, vol. X, No. Y, Journal of Applied Physics, USA.

* cited by examiner

*Primary Examiner* — Thomas K Pham
*Assistant Examiner* — Vipin Patel
(74) *Attorney, Agent, or Firm* — James M. Kasischke; Michael P. Stanley; Jean-Paul A. Nasser

(57) ABSTRACT

An acoustically-focused optical lens is provided that uses acoustic transducers arranged in diametrically-opposed pairs around an exterior surface of a cylindrical tube in order to concentrate (heavier-than-water metallic) particles suspended in water within the interior of the tube to be along a central axis of the tube. The transducers are activated in accordance with higher order (and odd order) Bessel functions to create an asymmetric mode in order to create the central axis node. Distortions in the optical lens can be further reduced by arranging two or more of the tubes in series with their central axes aligned.

5 Claims, 4 Drawing Sheets

Radial Distribution of U for the (0,1) mode

Radial Distribution of U for the (1,1) mode

Radial Distribution of U for the (2,1) mode

Radial Distribution of U for the (2,2) mode

ACOUSTICALLY FOCUSED OPTICAL LENS

STATEMENT OF GOVERNMENT INTEREST

The invention described herein may be manufactured and used by or for the Government of the United States of America for Governmental purposes without the payment of any royalties thereon or therefor.

CROSS REFERENCE TO OTHER PATENT APPLICATIONS

None.

BACKGROUND OF INVENTION

1) Field of the Invention

The present invention is directed to optical lenses formed by the selective concentration of particles in a liquid by acoustic pressure.

2) Description of Prior Art

Solutes can be concentrated in a liquid using externally-applied acoustic pressure, for example from ultrasonic wave generators. These solutes include particles suspended in the liquid. In addition, the optical index of refraction of a liquid can be changed by changing the particle distribution in the liquid.

U.S. Pat. No. 6,216,538 (Yasuda et al.) discloses an apparatus for handling particles in a fluid using acoustic radiation pressure. A method is provided that makes it theoretically possible to fix some types of particles at any position and to move and transport in any direction with any speed. Ultrasonic wave generating elements are focused in any position, and a force potential wall is produced at this focal point. The force potential at the focal point varies depending upon the densities of both water and the particles. For lighter particles such as polystyrene, the force potential has a minimum value at the focal point, and those particles are collected or concentrated at the focal point. For particles such as lead and iridium, the force potential takes a maximum value at the focal point, and those particles are repelled or move away from the focal point.

In order to change the optical index of refraction of a liquid such as water, heavier or denser particles need to be concentrated at the focal point. Therefore, an acoustically-focused optical lens is needed that concentrates the heavier particles at a point in the liquid to achieve the optical lens for desired use. Such particles will concentrate at or near nodes or nodal lines. The invention, as described below generates a node at the center for a greater concentration of particles.

SUMMARY OF THE INVENTION

Systems and methods in accordance with exemplary embodiments of the present invention are directed to an acoustically-focused optical lens that uses acoustic transducers arranged in diametrically-opposed pairs around an exterior surface or a circumference of a cylindrical tube in order to concentrate heavier-than-water particles suspended in water within the interior of the tube to be along a central axis of the tube. The acoustic transducers are activated in accordance with higher order asymmetric modes induced by odd, order Bessel functions having an angular dependence in order to create the central axis node. Distortions in the optical lens can be further reduced by arranging two or more of the tubes in series with their central axes aligned.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

Exemplary embodiments of systems and methods in accordance with the present invention increase the index of refraction of a liquid by introducing an appropriate particle distribution to change the properties of the overall medium. This produces an optical lens that can be changed at will by changing the focal length of the lens.

Figure 1:
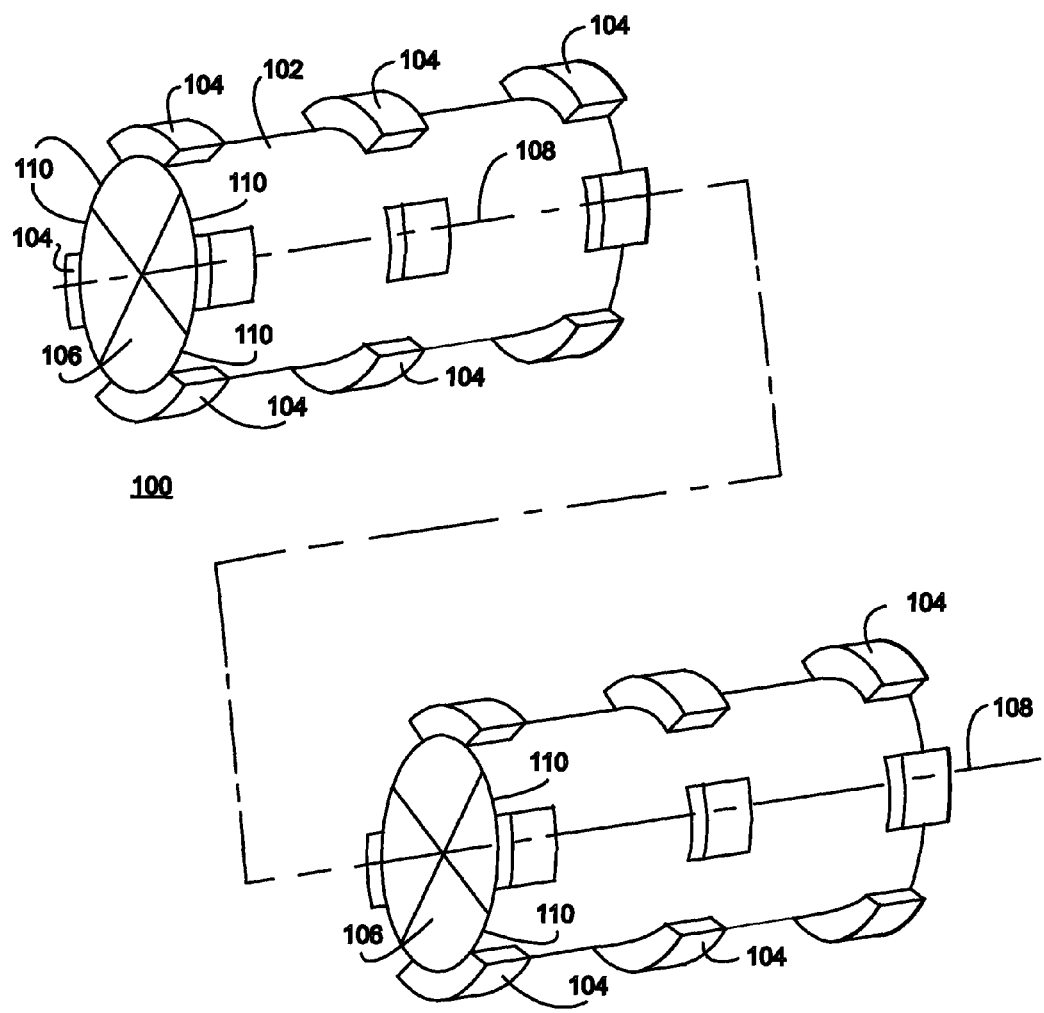
FIG. 1 is a schematic representation of an embodiment of an acoustically-focused optical lens in accordance with the present invention.

Referring initially to FIG. 1, and exemplary embodiment of an acoustically focused optical lens 100 in accordance with the present invention is illustrated. The optical lens 100 includes at least one elongated tube 102. As illustrated, the tube 102 is a cylinder, having a circular cross section. In one embodiment, the optical lens 100 includes two or more tubes 102 aligned axially and arranged in series.

The length and cross-sectional diameter or width of each tube 102 can be varied from a fraction of an inch (e.g., tenths, hundredths, sixteenths, eights, and quarters) up to several inches or several tens of inches. Suitable lengths and diameters include, but are not limited to, 0.1 inches, 0.25 inches, 0.5 inches, 0.75 inches and 1 inch. Preferably, the length of the tube 102 is approximately 1 inch, and the diameter of the tube is approximately 1 inch.

The interior 106 of the tube 102 is filled with a liquid, and the ends of the tube are sealed with a material that is transparent to the wavelengths of light that are to be focused by the optical lens. Preferably, the liquid is water.

Particles are suspended in the liquid. The particles are suspended in a concentration to produce the desired focal length changes in the optical lens 100. In general, a higher concentration of particles facilitates a smaller or shorter tube length. The concentration level will be calibrated for the amount of optical magnification needed.

The size of the particles is selected to be small enough such that the particles can be suspended in the liquid and remain stable within the liquid. In one embodiment, the particles are nano-particles. The suspended particles have a density greater than the density of the liquid. Suitable particles include, but are not limited to, metal particles, for example, lead particles or iridium particles.

The particles can be moved or ultrasonically adjusted or concentrated at locations within the tube 102 as desired. Therefore, the optical lens includes a plurality of ultrasonic transducers 104 disposed on the exterior of the tube 102 and running along the length of the tube. Suitable ultrasonic transducers are known and available in the art. Preferably, the ultrasonic transducers 104 are arranged in diametrically-opposed pairs. In one embodiment, the optical lens 100 includes a single pair of ultrasonic transducers. In another embodiment, the optical lens 100 includes two pairs of ultrasonic transducers. In one embodiment, each ultrasonic transducer extends along the entire length of the tube 102.

As illustrated in FIG. 1, twelve ultrasonic transducers 104 are arranged in two-pair groups spaced along the length of the tube 102. In general, increasing the number of ultrasonic transducers improves the performance of the optical lens. Therefore, an optimum number of ultrasonic transducers would be the maximum number of transducers that can be placed around the tube. These transducers can be spaced from one another or can be contiguous. The operation of each transducer typically does not interfere with the others, since the primary mode is radial, as long as there is some separation between adjacent transducers to minimize lateral coupling.

The ultrasonic transducers 104 change the distribution of the particles suspended in the liquid and in particular concentrate the particles at desired locations in the interior of the tube 104. In one embodiment, the ultrasonic transducers 104 relocate the suspended particles so that the particles are selectively concentrated along a reference axis 108 running through the center of the tube 102, rather the particles than being uniformly distributed throughout the interior 106 of the tube. This central axis concentration of the suspended particles increases the optical index of refraction in the center so that the tube 102 acts as an optical lens that can be rapidly adjusted.

In one embodiment, the correct particle density distribution is achieved by exciting the appropriate acoustic modes. The modes are solutions to the partial differential equation expression of the acoustic wave equation in cylindrical coordinates:

$$\frac{\partial^2 U}{\partial t^2} = c^2 \left[ \frac{\partial^2 U}{\partial r^2} + \frac{1}{r}\frac{\partial U}{\partial r} + \frac{1}{r^2}\frac{\partial^2 U}{\partial \theta^2} \right] \quad (1)$$

Where "U" is the acoustic particle velocity in the radial direction, "c" is the speed of sound, "r" is the radial coordinate, "θ" is the angular dimension in cylindrical coordinates in radians and "t" is time.

This partial differential equation has the solution:

$$U(r, \theta, t) = \sum_{m=1}^{\infty}\sum_{n=0}^{\infty} J_n(\lambda_{mn}r)[A\cos n\theta + B\sin n\theta]\cos\lambda_{mn}ct \quad (2)$$

Where "$J_n$" is the Bessel Function, "n" is the order of the Bessel function, m is mode number for a given value of n, and "λ" is the value of the roots, i.e., where the particular Bessel Function is zero. The boundary condition at r=1 consists of a non-zero acoustic particle velocity on the circular boundary. This particle velocity is imposed by an ultrasonic transducer and can be expressed as follows:

$$\frac{\partial U}{\partial r}(1, \theta) = 0 \quad (3)$$

When n=0, this leads to:

$$\frac{dJ_0(\lambda r)}{dr} = -J_1(\lambda r) = 0 \quad (4)$$

For r=1, the non-zero roots, that is the values that are not zero and that will solve the equation for the given geometry are as follows:

$\lambda_{10} \cong 3.8317;$ $\lambda_{20} \cong 7.0156;$ $\lambda_{30} \cong 10.1735;$ $\lambda_{40} \cong 13.3237;$ $\lambda_{50} \cong 16.4706;$ \quad (5)

These are axisymmetric modes, the simplest of which is given by:

$J_0(\lambda_{10})\cos \lambda_{10}ct$ \quad (6)

Figure 2:
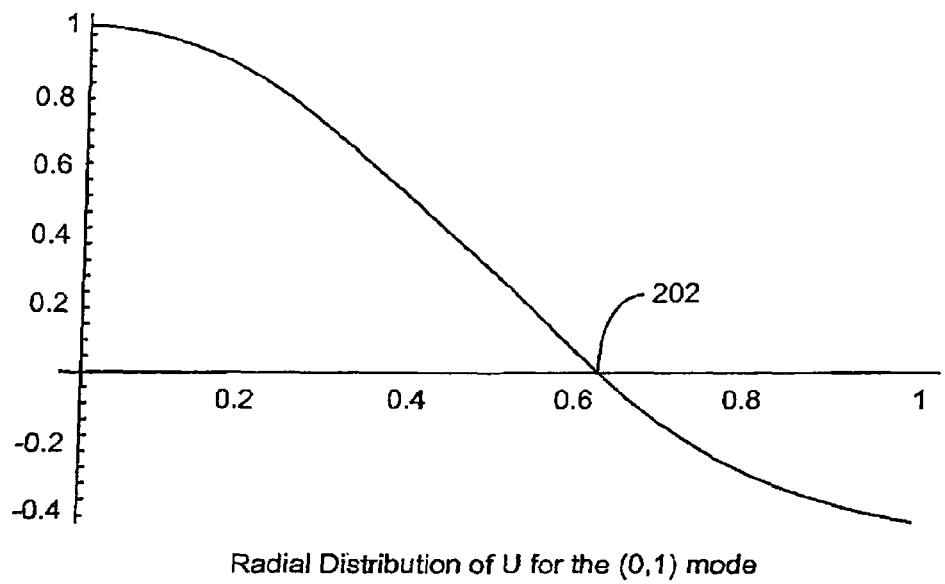
FIG. 2 is a graph illustrating the radial distribution of particle velocity within the optical lens tube of the present invention for the (0,1) mode.

The problem with this approach is that the maximum amplitude is at the center of the cylinder, so that the particle density will be at a minimum at the center. The particles aggregate in regions having the lowest acoustic particle velocity amplitude. The radial distribution of U, the acoustic particle velocity, is illustrated in FIG. 2 for the (1, 0) mode. According to the illustrated graph, a ring of particles will form at the radial distance where the distribution intersects the x-axis 202. This radial location, however, is not along the center axis of the tube.

Methods and systems in accordance with exemplary embodiments of the present invention use ring segments to drive appropriate asymmetric modes in order to ensure that there is a node at the center of the tube 102. As used herein, ring segments refer to the dividing of the outer circumference of the tube 102 or ring into segments.

As illustrated in FIG. 1, four ring segments 110 are defined in the outer circumference of the tube 102. An acoustic transducer 104 is placed in each ring segment 110 at each location along the length of the tube 102 at which pairs of acoustic transducers 104 are placed. In a variant of the present invention, each acoustic transducer 104 can occupy the entire portion of the circumference; thereby defining the ring segment or only a portion of the circumference.

The use of ring segments produces a higher relative particle density at the center and, therefore, a greater optical index of refraction in the center. As these asymmetric modes can produce distortions, these distortions are minimized by using higher order modes, although some distortions may remain. Therefore, although illustrated in FIG. 1 with four ring segments, the optical lens can include more ring segments—for example, six, eight, ten, twenty, fifty or on hundred ring segments. Preferably, the optical lens includes more ring segments, as this increases the number of acoustic transducers and reduces distortions.

As an example, two transducers appropriately driven will lead to a mode described by:

$$J_1(\lambda_{11})\cos\lambda_{11}ct \quad (7)$$

Where the roots solve the equation:

$$\frac{\partial J_1(\lambda r)}{\partial r} = J_0(\lambda r) - \frac{J_1(\lambda r)}{r} = 0 \quad (8)$$

For r=1, the roots are as follows:

$\lambda_{11} \cong 1.8412;$ $\lambda_{21} \cong 5.3314;$ $\lambda_{31} \cong 8.5363;$ $\lambda_{41} \cong 11.7060;$ $\lambda_{31} \cong 14.8636.$ (9)

Figure 3:
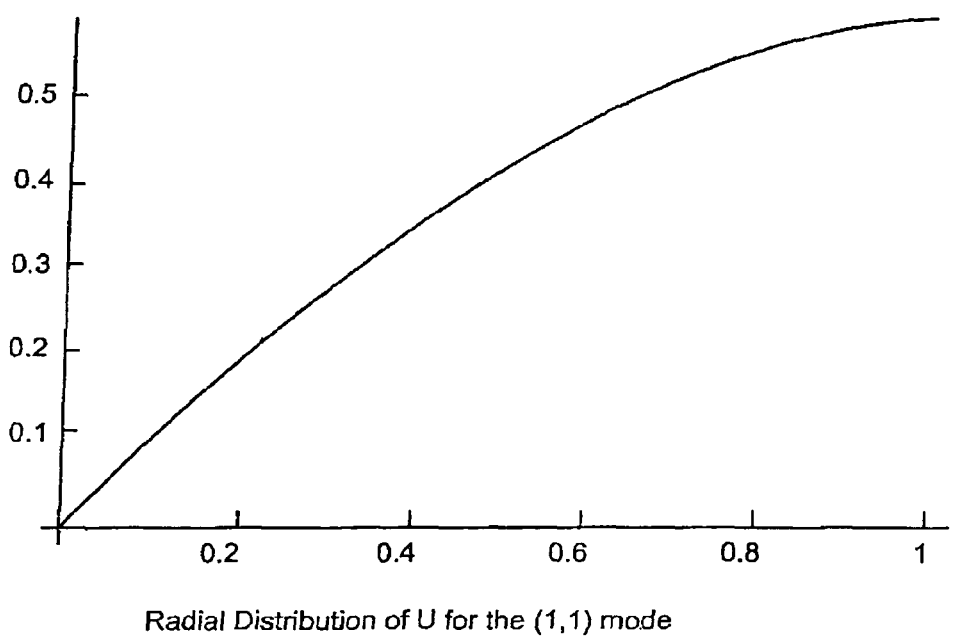
FIG. 3 is a graph illustrating the radial distribution of particle velocity within the optical lens tube of the present invention for the (1,1) mode.

The radial distribution of U for the (1, 1) mode is illustrated in FIG. 3. As illustrated, the radial distribution intersects the x-axis at a radius of zero. Therefore, the particles concentrate at the along the center axis of the tube 102.

Figure 4:
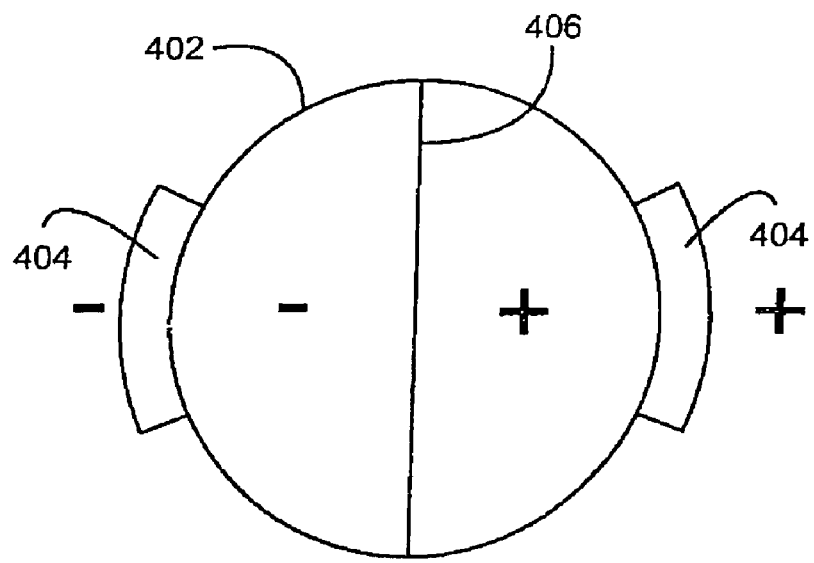
FIG. 4 is a schematic representation of a cross section of an tube showing an arrangement of two diametrically opposed acoustic transducers.

Referring to FIG. 4, a cross section of a tube 402 is illustrated showing a pair of diametrically-opposed acoustic transducers 404. The acoustic transducers 404 are driven asymmetrically (i.e., in accordance with an odd order Bessel function) producing opposite particle displacements inside the tube as indicated by the "−" and "+" signs. The single pair of acoustic transducers, (i.e., two ring segments) yields a twofold symmetry with a nodal line 406 that divides the tube 402 in half and that runs down the center of the tube. The particle velocity at a nodal line is zero.

Figure 5:
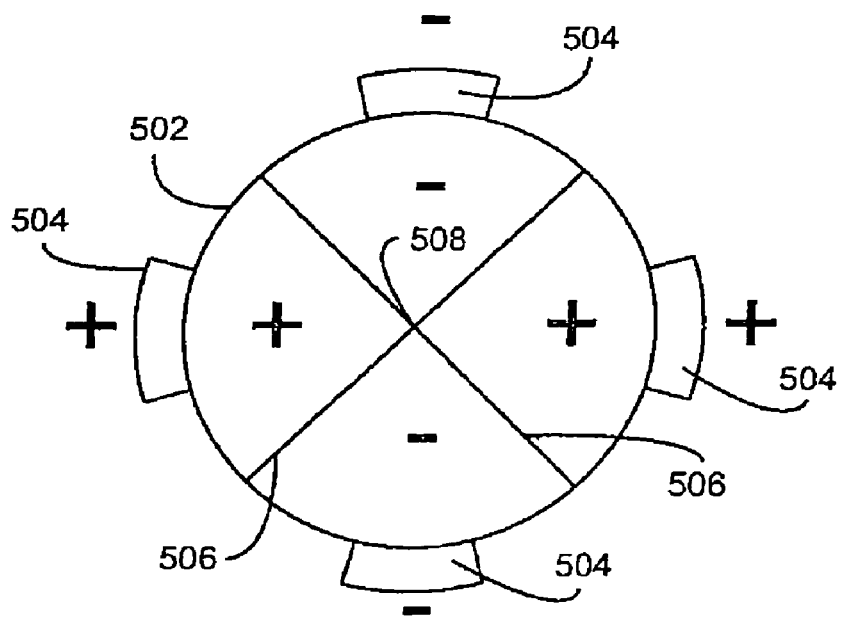
FIG. 5 is a schematic representation of a cross section of an tube showing an arrangement of four acoustic transducers arranged in two diametrically opposed pairs.

Distortions can be minimized by exciting higher order modes, (e.g., $J_2(\lambda_{12})\cos\lambda_{12}ct$). As illustrated in FIG. 5, two pairs of diametrically opposed acoustic transducers 504 are arranged on the outer surface of the tube 502. Again, each opposing pair is operated asymmetrically as indicated by the "−" and "+" signs. This yields two nodal lines 506 and produces a concentration point along the central axis 508 of the tube. Therefore, optical lenses that operate in accordance with odd order (and higher order) Bessel functions are preferred; as these higher order functions concentrate the suspended particles along the central axis of the tube 508. Four acoustic 504 transducers disposed in four ring segments and spaced around the outer surface of the tube 508 can support Bessel functions with n=0 n=1 or n=2.

Solving the equation $$\frac{\partial J_2(\lambda r)}{\partial r} = 0$$

leads to the roots:

$\lambda_{12} \cong 3.0542;$ $\lambda_{22} \cong 6.7061;$ $\lambda_{32} \cong 9.9695;$ $\lambda_{42} \cong 13.1704;$ $\lambda_{52} \cong 16.3475.$ (10)

Figure 6:
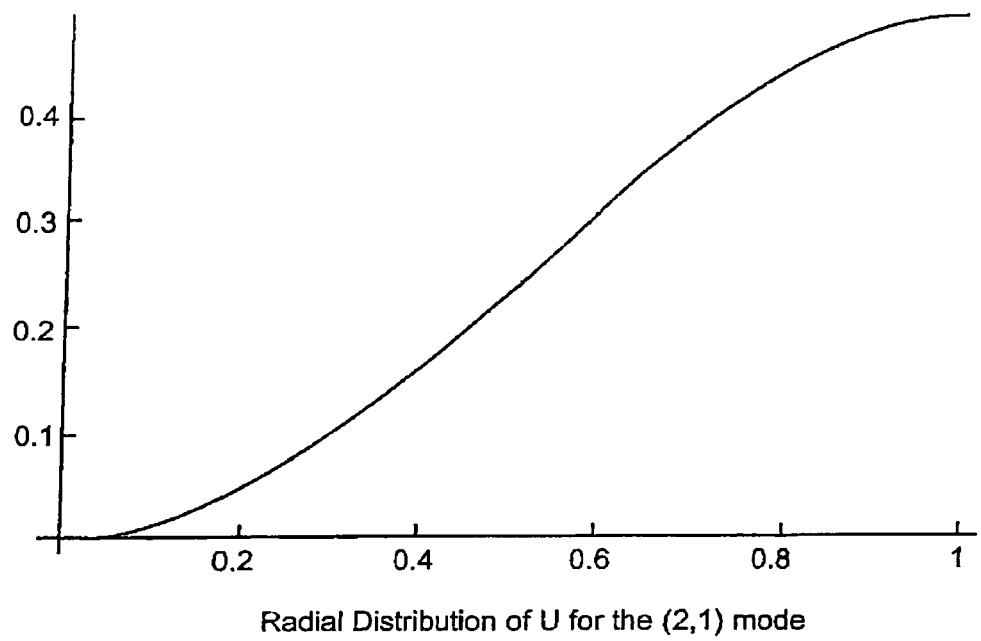
FIG. 6 is a graph illustrating the radial distribution of particle velocity within the optical lens tube of the present invention for the (2,1) mode.

The radial distribution of U for the (2, 1) mode is illustrated in FIG. 6.

Figure 7:
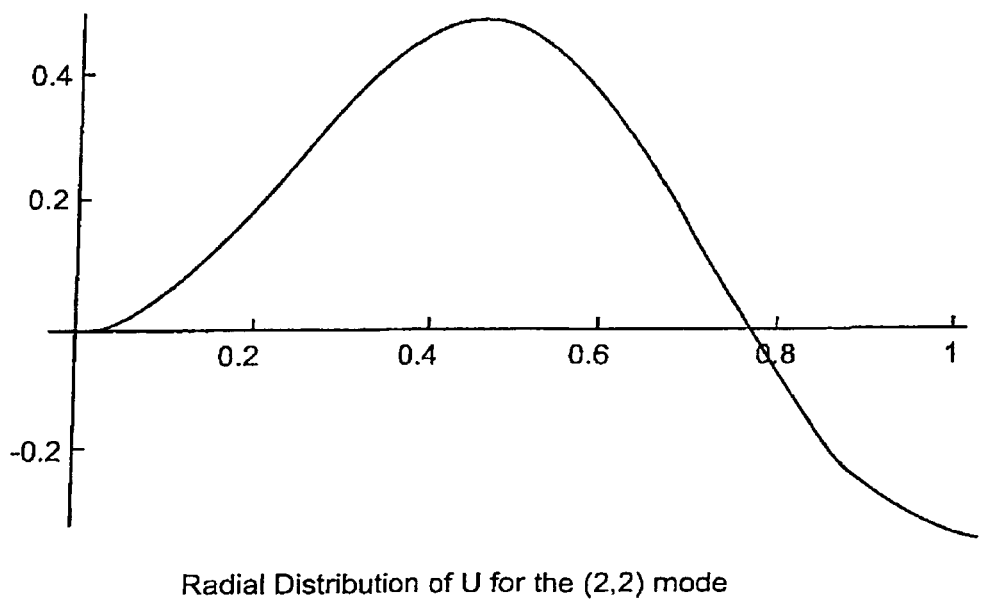
FIG. 7 is a graph illustrating the radial distribution of particle velocity within the optical lens tube of the present invention for the (2,2) mode.

As the number of transducers n increases, the distortions decrease. However, increasing n can also produce undesirable effects such as an increased cost of the optical lens. Increasing m (the mode number) has the effect of reducing the area of particle confinement in the region around r=0. This area reduction produces a higher particle density in the r=0 region. The radial distribution of U for the (2, 2) mode is illustrated in FIG. 7.

In one embodiment, distortions in the optical lens are reduced by using two or more of the optical lens in accordance with the present invention arranged in series. Therefore, the optical lenses are arranged end-to-end with the central axes of the optical lenses aligned. The acoustic modes of adjacent optical lenses in the series have mirror symmetry along a reference line bi-secting each tube and can arranged so that the particle density summed over both lenses is symmetric. In one embodiment, the acoustic transducers on adjacent lenses are synchronized in order to achieve symmetric particle density.

In accordance with one exemplary embodiment, the present invention is directed to an acoustically-focused optical lens that includes a tube of given length that has an interior filled with a liquid—such as water. The tube is preferably cylindrical with a length of to approximately one inch and a diameter of approximately one inch. A plurality of particles having a density greater than a density of the liquid is suspended in the liquid. These particles include lead, iridium and combinations thereof.

A plurality of acoustic transducers is spaced around the exterior surface of the tube. The acoustic transducers are arranged in diametrically-opposed pairs. Preferably, the acoustic transducers span the entire length of the tube in order to concentrate the particles along a central axis of the tube, creating the desired lens effect. The plurality of acoustic transducers is configured to produce acoustic waves in accordance with an odd order Bessel function. This creates a node running along a central axis of the tube such that the plurality of particles is concentrated at that node. The chosen odd order Bessel function is preferably a higher order Bessel function. In one embodiment, the acoustic waves are produced in accordance with an asymmetric mode induced by an odd order Bessel function having at least two nodal lines, as shown in FIG. 5.

An even number of acoustic transducers is selected so that the acoustic transducers can be arranged in diametrically-opposed pairs in order to effectuate the use of the asymmetric modes involving odd order Bessel functions. In one embodiment, at least four acoustic transducers are placed around the tube.

In one embodiment, each transducer is disposed in a ring segment of the exterior surface of the tube such that each ring segment comprises a single acoustic transducer. Each ring segment comprises a portion of a ring drawn around the exterior surface perpendicular to the central axis. In other variants, the tube can include a single ring segment spanning the length of the tube or can include a plurality of ring segments spaced along the length of the tube.

As with the acoustic transducers, an even number of ring/segments is selected so that the acoustic transducers can be arranged in diametrically-opposed pairs in order to effectuate use of the asymmetric modes induced by the odd order Bessel functions. In one embodiment, the optical lens includes at least four ring segments. Alternatively, the optical lens includes at least ten ring segments.

Exemplary embodiments of the present invention are also directed to an acoustically-focused optical lens as described above that includes a plurality of tubes. Each tube is configured as described above. In order to reduce distortions in the optical lens the plurality of tubes are arranged in series such that the central axes of the tubes align.

In one embodiment, the acoustic modes of adjacent optical lenses in the series have a mirror symmetry along a line bisecting each tube and are arranged such that a particle density summed over both lenses is symmetric. In addition, the acoustic transducers on adjacent lenses in the series are synchronized in order to achieve symmetric particle density.

Exemplary embodiments of the present invention are also directed to a method for acoustically-focusing an optical lens. A plurality of particles is suspended in a liquid disposed within the interior of a tube. Each particle has a density greater than a density of the liquid. Acoustic waves are produced within the liquid in accordance with an asymmetric mode in order to create a node running along a central axis of the tube such that the plurality of particles are concentrated at that node. Preferably, the asymmetric mode induced by an odd order Bessel function contains at least two nodal lines. In one embodiment, a plurality of tubes is used, and the plurality of tubes is arranged in series such that the central axes of the tubes are aligned.

In addition, a plurality of acoustic transducers is used spaced around an exterior surface of the tube in diametrically-opposed pairs and spanning a length of the tube. A single acoustic transducer is placed in each one of a plurality of ring segments. Each ring segment represents a portion of a ring drawn around the exterior surface perpendicular to the central axis.

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. An acoustically focused optical lens comprising:
   a tube having an interior and a length;
   a liquid disposed within the interior;
   a plurality of particles suspended in the liquid, each particle having a density greater than the density of said liquid; and
   a plurality of acoustic transducers spaced around an exterior surface of the tube and spaced in diametrically-opposed pairs and spanning the length at intervals;
   wherein the plurality of acoustic transducers are configured to produce acoustic waves in accordance with an asymmetric mode induced by an odd order Bessel function in order to create a node running along a central axis of the tube such that the plurality of particles are concentrated at that node;
   wherein the tube is a cylinder having a diameter of approximately 1 inch and the length is approximately one inch.

2. An optical lens with a plurality of tubes, each tube of said plurality of tubes comprising:
   an interior and a length;
   a liquid disposed within said interior;
   a plurality of particles suspended in said liquid, each particle having a density greater than a density of said liquid; and
   a plurality of acoustic transducers spaced around an exterior surface of each of said tubes with each of said transducers in diametrically-opposed pairs and spanning the length at intervals;
   wherein said plurality of acoustic transducers are configured to produce acoustic waves in accordance with an asymmetric mode induced by an odd order Bessel function to create a node running along a central axis of said tube such that said plurality of particles are concentrated at that node and said plurality of tubes are arranged in series such that the central axes of said tubes align;
   wherein each tube of said plurality of tubes is a cylinder having a diameter of approximately one inch and a length of approximately one inch.

3. An acoustically focused optical lens comprising:
   a tube having an interior and a length;
   a liquid disposed within the interior;
   a plurality of particles suspended in the liquid, each particle having a density greater than the density of said liquid; and
   a plurality of acoustic transducers spaced around an exterior surface of the tube and spaced in diametrically-opposed pairs and spanning the length at intervals;
   wherein the plurality of acoustic transducers are configured to produce acoustic waves in accordance with an asymmetric mode induced by an odd order Bessel function in order to create a node running along a central axis of the tube such that the plurality of particles are concentrated at that node;
   wherein the acoustic waves are produced in accordance with an asymmetric mode induced by an odd order Bessel function having at least two nodal lines.

4. A method for acoustically focusing an optical lens, said method comprising the steps of:
   suspending a plurality of particles in a liquid disposed within the interior of a tube with each particle having a density greater than a density of the liquid;
   producing acoustic waves within the liquid in accordance with an asymmetric mode induced by an odd order Bessel function to create a node running along a central axis of the tube such that the plurality of particles are concentrated at the node wherein said step of producing the acoustic waves further comprises activating a plurality of acoustic transducers positioned around an exterior surface of the tube in diametrically-opposed pairs and spanning a length of the tube in intervals; and
   placing a single acoustic transducer of the plurality of the transducers in each one of a plurality of ring segments with each ring segment having a portion of ring drawn around the exterior surface surrounding the central axis.

5. A method for acoustically focusing an optical lens, said method comprising the steps of:
   suspending a plurality of particles in a liquid disposed within the interior of a tube with each particle having a density greater than a density of the liquid; and
   providing acoustic waves within the liquid in accordance with an asymmetric mode induced by an odd order Bessel function to create a node running along a central axis of the tube such that the plurality of particles are concentrated at the node;
   wherein the asymmetric mode induced by an odd order Bessel function comprises at least two nodal lines.

* * * * *